Figure 3:
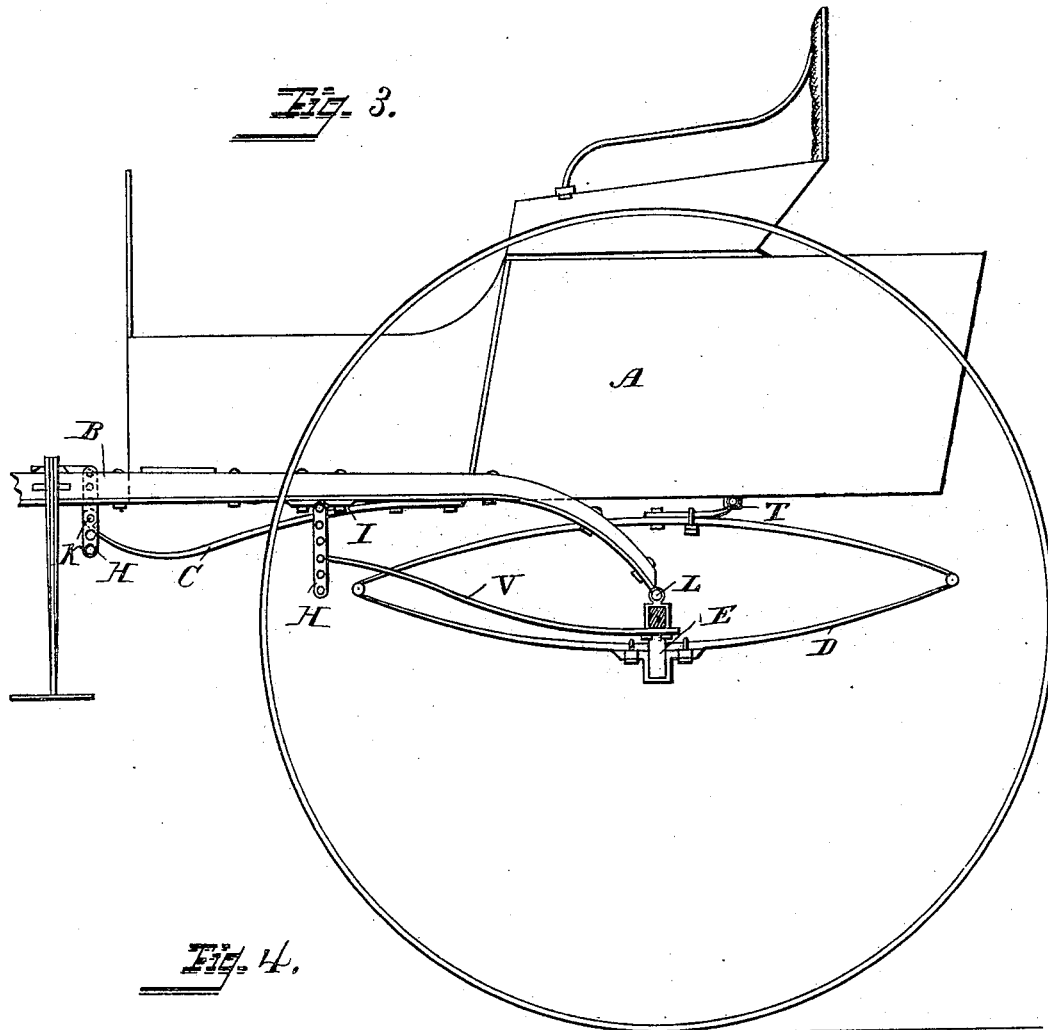

(No Model.) 3 Sheets—Sheet 1.
C. W. SALADEE.
TWO WHEELED VEHICLE.
No. 298,412. Patented May 13, 1884.
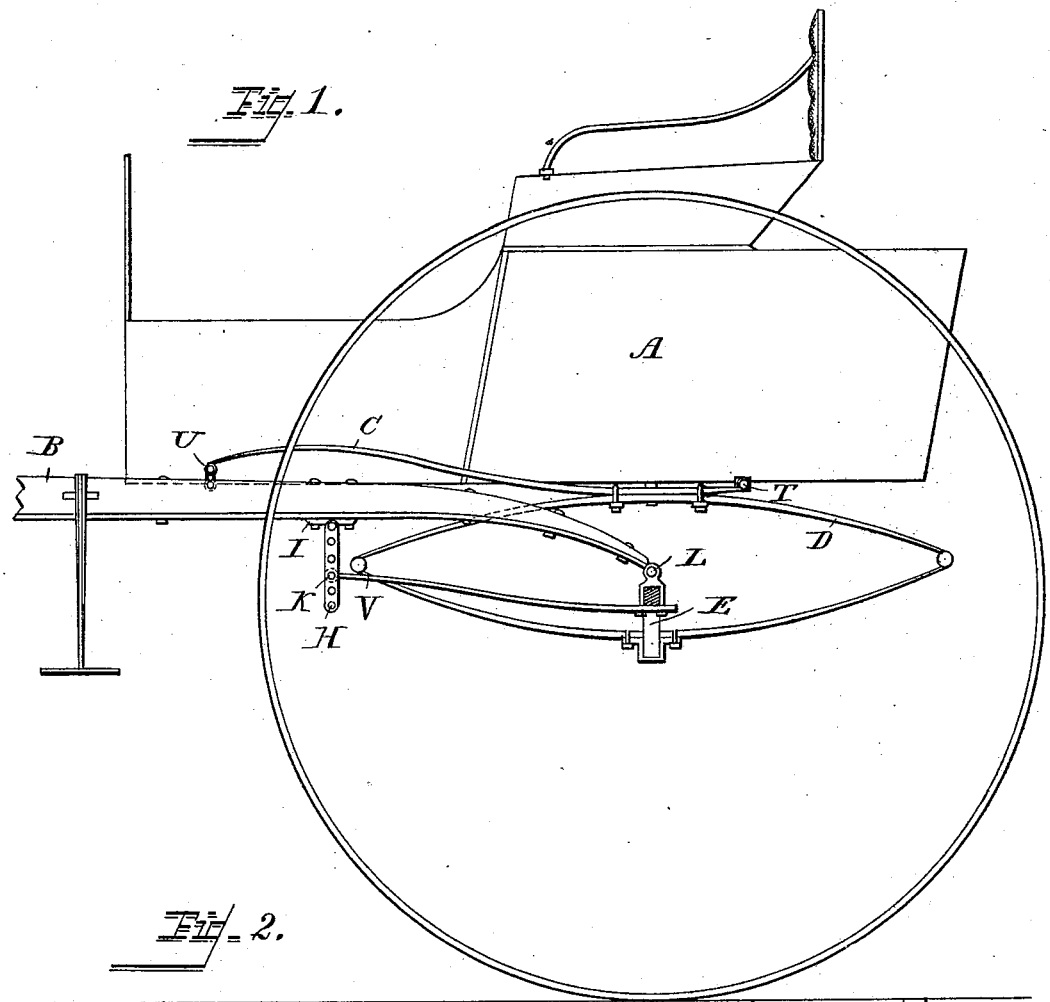
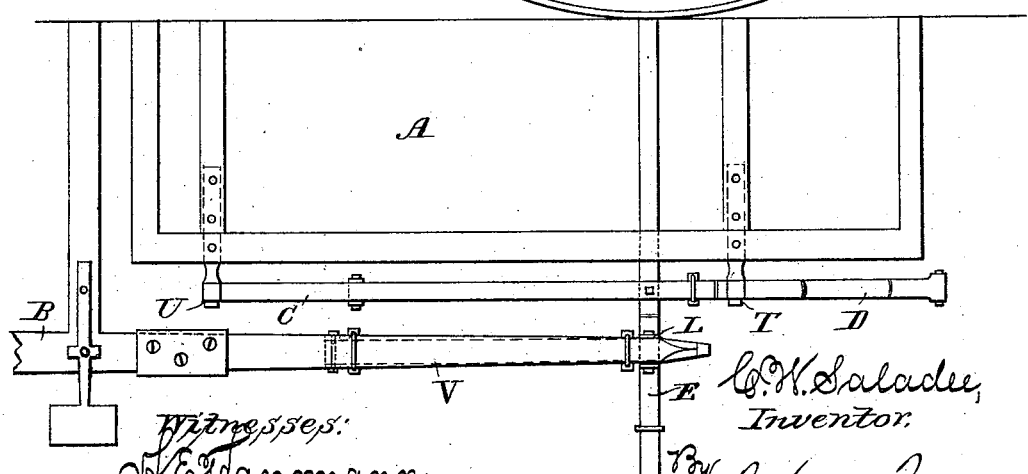

(No Model.) 3 Sheets—Sheet 2.

C. W. SALADEE.
TWO WHEELED VEHICLE.

No. 298,412. Patented May 13, 1884.

(No Model.) 3 Sheets—Sheet 3.

C. W. SALADEE.
TWO WHEELED VEHICLE.

No. 298,412. Patented May 13, 1884.

Witnesses:
H. E. Hansmann.
Josephine Campbell.

C. W. Saladee,
Inventor.
By Foster & Freeman
Attorneys.

UNITED STATES PATENT OFFICE.

CYRUS W. SALADEE, OF TORRINGTON, CONNECTICUT.

TWO-WHEELED VEHICLE.

SPECIFICATION forming part of Letters Patent No. 298,412, dated May 13, 1884.

Application filed July 12, 1883. (No model.)

*To all whom it may concern:*

Be it known that I, CYRUS W. SALADEE, a citizen of the United States, and a resident of Torrington, in the county of Litchfield and State of Connecticut, have invented certain new and useful Improvements in Two-Wheeled Vehicles, of which the following is a specification.

My invention relates to two-wheeled vehicles, and has for its object, first, an improved mode of connecting the shafts or pole to the vehicle, whereby to admit of the ready adjustment of the same in relation to the axle and body to carry the latter level; second, an improved spring-platform adapted to carry the body independent of the shafts; and, third, the arrangement of a flexion-spring in connection with the axle and shafts or pole, in such manner that said spring shall serve the double purpose of a device for adjusting the "set" of the shafts to carry the body level, and also to relieve the latter, by means of said spring, from the motion of the horse, all as fully hereinafter set forth.

In the drawings, Figure 1 represents the side elevation of a two-wheeled vehicle embodying the main features of my invention. Fig. 2 is a half plan view of the same. Figs. 3, 4, 5, and 6 are modifications.

Referring to Figs. 1 and 2, A is the body, E the axle, and D an elliptical side spring interposed between the axle and body.

C is a quarter-elliptic spring, the rear end of which is rigidly secured to the body or to the top member of the spring D, and there terminates in an eye for the pintle-bearing T, on which is supported the rear end of the body. The opposite end of the spring C unites with the front end of the body upon the pintle-bearing U. The shafts B have their rear ends pivotally connected to the axle E, as at L. An arm or under brace, V, the rear end of which terminates at and is rigidly secured to the axle or to any attachment thereof, is applied as shown in Figs. 1 and 3, and at its front end is connected with the side bars or shafts, B, at a suitable distance in front of the axle, by means of a hanger-link, H. This link H is pivoted to a plate, I, secured to the shaft, and has a series of holes pierced through it to receive a bolt, K, by adjusting which the front end of the brace V may be raised or lowered, thereby changing the set of the front end of the shafts up or down, to suit horses of different heights and maintain the body level. The shafts are thus held in their relation to the axle when in use, independently of the springs supporting the body, and the latter is pivotally connected to the spring D behind, and in front is suspended to the end of the spring C. Owing to this construction, the vertical movement given to the front end of the shafts by the motion of the horse is not transmitted to the body, as but little of this movement is imparted to the axle and the pintle-bearing T, and the spring C, supporting the front end of the body independent of all contact with the shafts, will prevent any such transmission of motion from the axle to the body.

Figure 4:
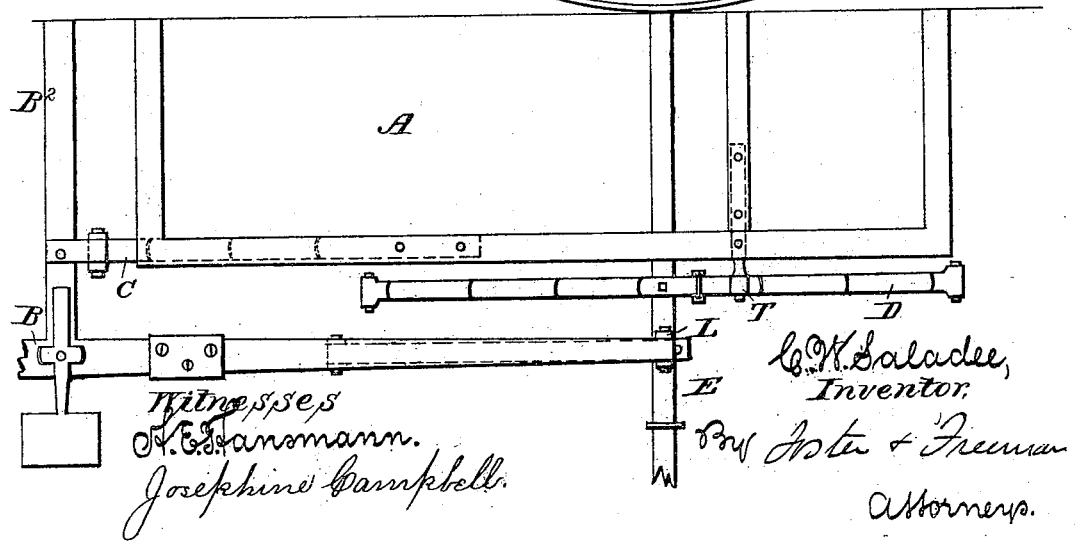

Referring to Figs. 3 and 4, the spring C, in place of extending rearward and connecting to the top of the spring D, is bolted directly to the body and extended forward to unite with the cross-bar $B^2$ or other part of the shaft-frame through the medium of a hanger-link, H. This secures a double-adjusting device—one to regulate the set of the shafts in relation to the axle and the other to adjust the "hang" of the body in relation to the shafts to carry it level. The front end of the body will yield to the action of the spring C imparted to it by the motion of the shafts, and the body is relieved of the "horse motion," as in the arrangement of parts seen in Figs. 1 and 2.

Figure 5:
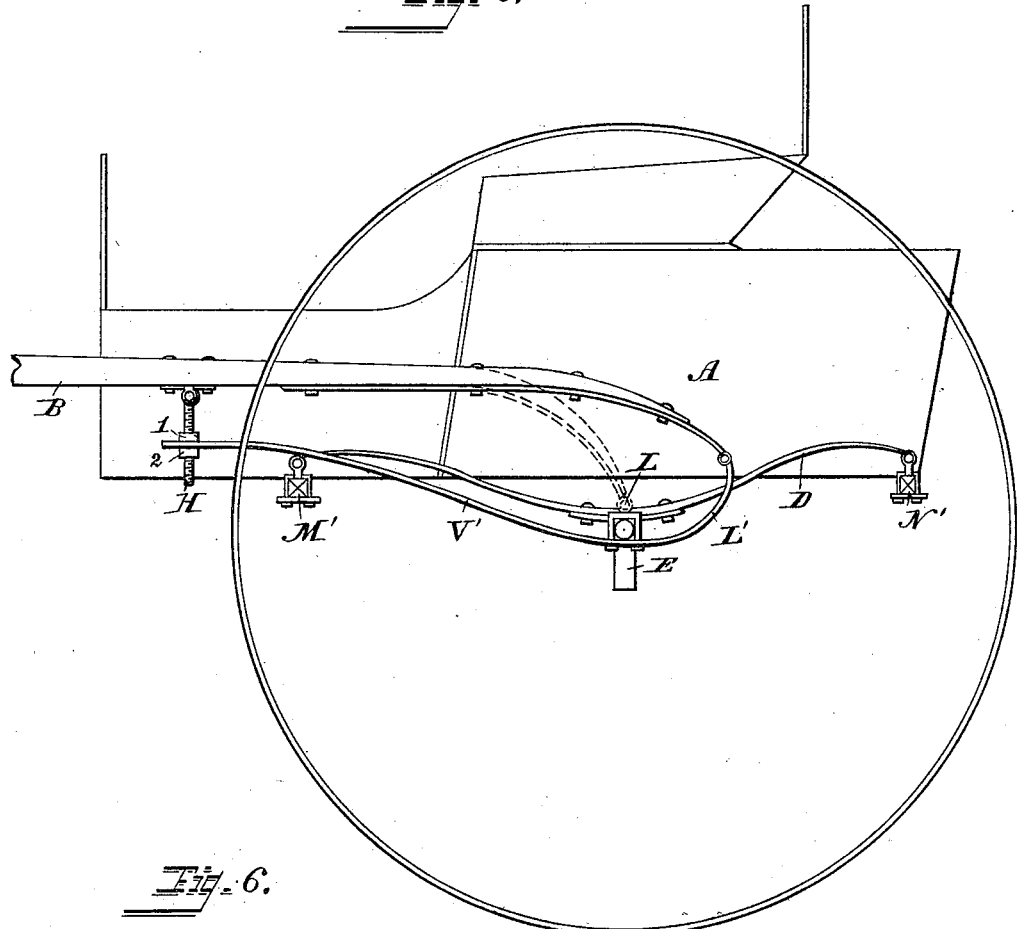
Figure 6:
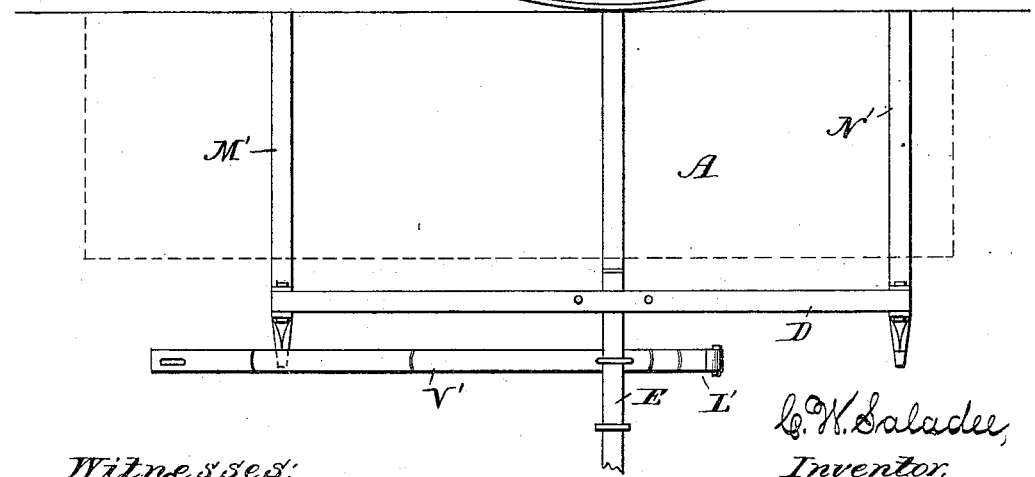

In the modification shown in Figs. 5 and 6, semi-elliptic side springs, D, are substituted for the elliptical springs shown in the other figures, being secured to a crank-shaped axle, E, and at the ends to cross-bars M' and N', supporting the body. The under brace, V, may be rigid, or it may be a flexion-spring composed of one or more plates rigidly secured to the axle and extending back of the latter to form an arm, L', to which are joined the rear ends of the shafts B. At the forward end the brace V unites with an adjusting device connecting it with the shafts at a suitable distance in front of the axle. Any suitable adjusting device may be employed. In this modification I preferably adopt the hanger-bolt H, pivoted to the side bars and shafts through the end of spring, and provided with set-nuts 1 and 2, between which to firmly hold the spring at any point. It will be understood that in this modification I have provided a double means to prevent the transmission of horse motion from the shafts or pole to the body of the vehicle—to wit, first, the side springs, D, supporting the body from their opposite ends independent of the shafts, and, second, a flexion-spring, V', of requisite tension. It will be further understood that this combination, with the axle, of the spring V', shafts B, and adjusting device connecting the front end of the spring to the shafts, as shown in Figs. 5 and 6, is equally applicable in connection with features shown in Fig. 1, or to any two-wheeled vehicle wherein the body is suspended upon springs independent of the shafts.

In any case where it is not desirable to extend the rear end of the spring V' to the rear of the axle to form the pintle-junction with the shafts, the spring may terminate at the axle, and the rear ends of the shafts may be connected directly to the axle.

I claim—

1. The combination of the axle, shaft-frame pivoted thereto, braces rigidly secured to the axle extending forward beyond the pivot-point and beneath the shaft, adjustable connection between the brace and shaft-frame, spring-supported body, and adjustable connection between the front body-spring and its support, substantially as set forth.

2. In a two-wheeled vehicle, the shafts pivotally connected to the axle B, in combination with under braces, V, rigidly secured to the axle, and united at their front ends with the side bars or shafts, B, through the medium of pivoted hanger-links H, substantially as and for the purpose set forth.

3. In a two-wheeled vehicle, the combination of the axle, the shafts or side bars pivotally connected to the axle, and the flexion under braces, V, rigidly united to the axle, and connected by an adjusting device to the shaft-frame in advance of the axle, substantially as and for the purpose set forth.

4. The flexion spring-braces rigidly secured to the axle, and extending back of the latter to form arms L', united to the shaft B, and projecting forward to unite with an adjusting device connecting it to the shaft-frame, substantially as set forth.

5. In a two-wheeled vehicle, the combination of springs D and C, the rear end of the latter rigidly secured to the top member of the spring D, and extended forward and pivotally connected to the body, and the rear end of the body pivotally supported upon the springs D, the whole combined and arranged to operate substantially as and for the purpose set forth.

6. In a two-wheeled vehicle, the two separately-arranged adjusting devices, combined with the frame, axle-body, and springs, the one to regulate the set of the shafts in relation to the axle and the other to regulate the hang of the body in relation to the shafts, substantially as set forth.

7. In combination with the springs and the side bars or shafts, B, the hangers having their upper ends pivotally connected to the shaft-frame, and a connection for the spring adjustable on the hangers, substantially as and for the purpose set forth.

In testimony whereof I have signed my name to this specification in the presence of two subscribing witnesses.

CYRUS W. SALADEE.

Witnesses:
CHAS. L. MCNEIL,
A. E. HAUSMANN.